US010395382B2

(12) United States Patent
Bustan et al.

(10) Patent No.: US 10,395,382 B2
(45) Date of Patent: Aug. 27, 2019

(54) VISUALIZATION OF DISTANCES ON AN ELECTROANATOMICAL MAP

(71) Applicant: BIOSENSE WEBSTER (ISRAEL) LTD., Yokneam (IL)

(72) Inventors: Itamar Bustan, Zichron Ya'acov (IL); Ido Ilan, Yoqneam (IL); Ronen Krupnik, Karmiel (IL); Assaf Cohen, Kiryat Bialik (IL)

(73) Assignee: Biosense Webster (Israel) Ltd., Yokneam (IL)

( * ) Notice: Subject to any disclaimer, the term of this patent is extended or adjusted under 35 U.S.C. 154(b) by 0 days.

(21) Appl. No.: 15/394,969

(22) Filed: Dec. 30, 2016

(65) Prior Publication Data

US 2018/0189969 A1 Jul. 5, 2018

(51) Int. Cl.
*G06T 7/62* (2017.01)
*G06T 19/20* (2011.01)
*G06T 15/04* (2011.01)
*G06T 11/20* (2006.01)

(52) U.S. Cl.
CPC .............. *G06T 7/62* (2017.01); *G06T 11/206* (2013.01); *G06T 15/04* (2013.01); *G06T 19/20* (2013.01); *G06T 2207/10004* (2013.01)

(58) Field of Classification Search
CPC ....................................................... A61B 8/483
See application file for complete search history.

(56) References Cited

U.S. PATENT DOCUMENTS

| | | | |
|---|---|---|---|
| 4,974,598 A | 12/1990 | John | |
| 6,208,347 B1 | 3/2001 | Migdal et al. | |
| 6,256,038 B1 | 7/2001 | Krishnamurthy | |
| 6,456,867 B2 | 9/2002 | Reisfeld | |
| 6,577,319 B1 | 6/2003 | Kashiwagi et al. | |
| 6,650,927 B1 | 11/2003 | Keidar | |
| 7,468,731 B2 | 12/2008 | Eldridge et al. | |
| 7,626,589 B2 | 12/2009 | Berger | |
| 7,689,021 B2 | 3/2010 | Shekhar et al. | |
| 7,796,790 B2 | 9/2010 | McNutt et al. | |
| 7,805,181 B2 | 9/2010 | Breeuwer | |
| 8,155,400 B2 | 4/2012 | Bronstein et al. | |
| 8,174,535 B2 | 5/2012 | Berger et al. | |

(Continued)

FOREIGN PATENT DOCUMENTS

EP 2 749 213 A1 7/2014

OTHER PUBLICATIONS

Sethian, James A., "A fast marching level set method for monotonically advancing fronts", Proc. Natl. Acad. Sci. USA, Feb. 1996, pp. 1591-1595, vol. 93.

(Continued)

*Primary Examiner* — Jitesh Patel
(74) *Attorney, Agent, or Firm* — Vincent J. Serrao

(57) ABSTRACT

Described embodiments include an apparatus that includes a display and processor. The processor is configured to receive, from a user, an input that indicates one or more points of interest on an electroanatomical map, of an anatomical surface, that is displayed on the display, and to superimpose on the map, in response to the input, a plurality of contours, each one of the contours being at a different respective geodesic distance, with respect to the surface, from the points of interest. Other embodiments are also described.

15 Claims, 5 Drawing Sheets

(56) References Cited

U.S. PATENT DOCUMENTS

| | | | |
|---|---|---|---|
| 8,270,693 B2 | 9/2012 | Zou et al. | |
| 8,788,029 B2 | 7/2014 | Madry et al. | |
| 8,907,944 B2 | 12/2014 | Lin et al. | |
| 9,129,417 B2 | 9/2015 | Zheng et al. | |
| 2005/0111710 A1* | 5/2005 | Gritzky | A61B 8/467 382/128 |
| 2006/0116575 A1* | 6/2006 | Willis | A61B 5/0422 600/434 |
| 2006/0170679 A1 | 8/2006 | Wang et al. | |
| 2006/0241445 A1* | 10/2006 | Altmann | A61B 8/12 600/443 |
| 2007/0232949 A1 | 10/2007 | Saksena | |
| 2007/0263915 A1* | 11/2007 | Mashiach | G06K 9/342 382/130 |
| 2008/0188962 A1* | 8/2008 | Suryanarayanan | G06K 9/4638 700/89 |
| 2008/0292147 A1* | 11/2008 | Bronstein | G06K 9/00214 382/118 |
| 2009/0122082 A1* | 5/2009 | Heron | G06T 7/0012 345/629 |
| 2010/0027861 A1 | 2/2010 | Shekhar et al. | |
| 2010/0295848 A1* | 11/2010 | Grewer | G06T 7/11 345/419 |
| 2011/0274352 A1* | 11/2011 | Blake | G06T 7/11 382/173 |
| 2012/0101398 A1* | 4/2012 | Ramanathan | A61B 5/04012 600/523 |
| 2013/0050207 A1 | 2/2013 | Lin et al. | |
| 2013/0222368 A1 | 8/2013 | Takama et al. | |
| 2014/0247284 A1 | 9/2014 | Gooding et al. | |
| 2014/0330111 A1 | 11/2014 | Lichtenstein et al. | |
| 2016/0287141 A1* | 10/2016 | Sidlesky | A61B 5/0073 |

OTHER PUBLICATIONS

European Search Report dated May 4, 2018 from corresponding European Patent Application No. 17211054.6.

Iglesias, David Soto et al., "Quantitative Analysis of Electro-Anatomical Maps: Application to an Experimental Model of Left Bundle Branch Block/Cardiac Resynchronization Therapy", IEEE Journal of Translational Engineering in Health and Medicine Dec. 16, 2016, pp. 1-15, vol. 5.

Sapp, John L., MD et al., "Inverse Solution Mapping of Epicardial Potentials Quantitative Comparison With Epicardial Contact Mapping", Circulation, Arrhythmia and Electrophysiology, Aug. 24, 2012, pp. 1001-1009, vol. 5, No. 5.

\* cited by examiner

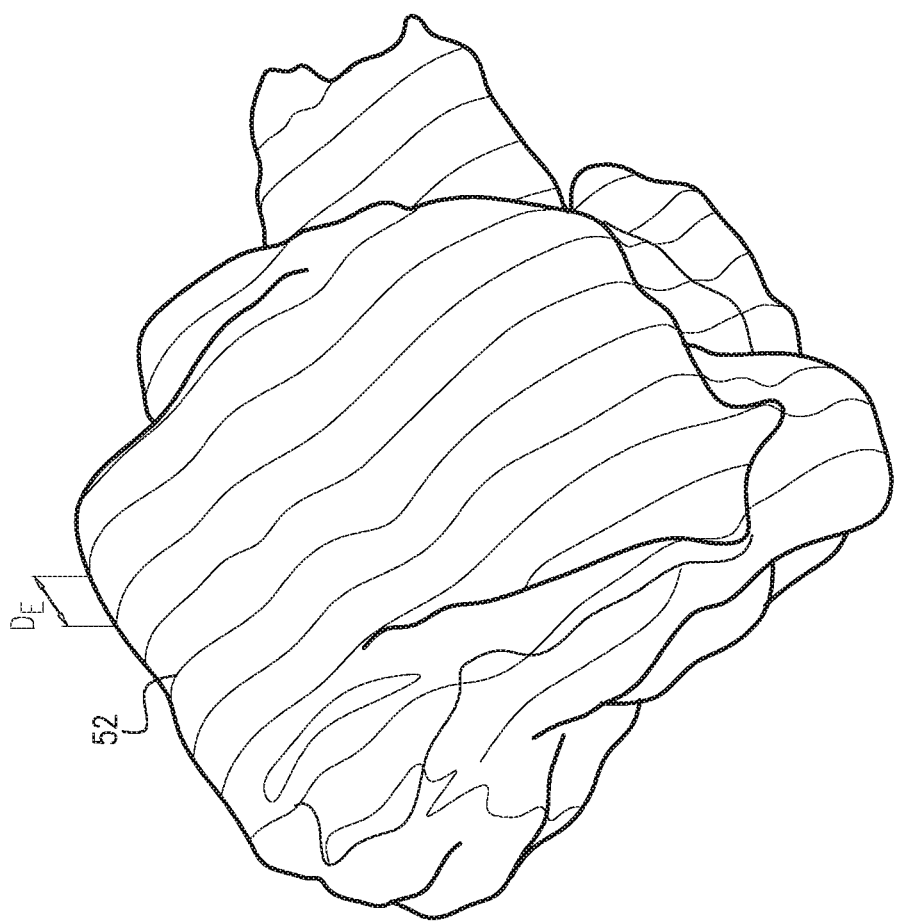

VISUALIZATION OF DISTANCES ON AN ELECTROANATOMICAL MAP

FIELD OF THE INVENTION

The present invention relates to methods and interfaces for interacting with computer-rendered models, such as computer-rendered models of anatomical surfaces.

BACKGROUND

Three-dimensional surfaces are often represented in computer memory by a contiguous collection of tiles, such as triangular tiles. Such a representation may be referred to as a "tesselation" or a "mesh."

A "geodesic distance" between two points that lie on a surface is the length of the shortest path, along the surface, that connects the two points. For points lying on a curved surface, this distance is often different from the Euclidean distance between the points. For example, the geodesic distance between two hilltops is the length of the shortest path that runs, along the surface of the Earth, between the two hilltops. This distance is larger than the Euclidean distance between the hilltops, which is the length of a straight path, through the air, passing between the hilltops.

U.S. Pat. No. 4,974,598, whose disclosure is incorporated herein by reference, describes a system and method in medical non-invasive electrocardiographic analysis of human heart beats for the early detection of certain heart diseases in which a large number of electrodes, for example, 32 to 64, are attached on the chest, back and sides of the patient, i.e., "body surface." The electrical signals detected by the electrodes are converted to digital data, treated to remove muscle artifact and other noise, and then analyzed mathematically to determine the presence or absence of abnormal body surface potential distributions, or of unusual beat morphologies, compared statistically to the self-norm "typical beat" of the patient and also compared to a data base compiled from comparable normal population groups. The results of the statistical analysis are displayed as topographical maps of the body surface, color coded to represent the presence of significant derivations from the norms, defined as "abnormality", i.e., abnormal spatio-temporal patterns of voltages on the body surface, or as waveshape or histogram displays of features, similarly Z-transformed and color coded. Discriminant functions, stored in the heart state analyzer, estimate the relative probability of various cardiac pathologies.

US Patent Application Publication 2007/0232949, whose disclosure is incorporated herein by reference, describes a method for diagnosing and mapping atrial fibrillation that correlates recordings of electrical activity from intracardiac multi-electrode catheters with the locations of electrodes within the heart to obtain a global mapping of cardiac electrical activity. Time delay and/or amplitude information in the recorded electrical activities is fused with electrode location information to generate a display on a 3-D anatomical template of the heart. Time delay and/or amplitude information is displayed using color code and/or lines of equal value, to aid diagnosis and localization of electrical activity irregularities. Mapping of atrial fibrillation enables physicians to treat arrhythmia by ablation, pacing, shock therapy and/or drugs at initiation or during an episode based on therapy delivery at critical mapped locations for arrhythmia onset or maintenance. Locations for placement of pacing leads and pacemaker timing parameters may also be obtained from the display.

U.S. Pat. No. 8,155,400, whose disclosure is incorporated herein by reference, describes a method of cropping a representation of a face for electronic processing, said method comprising: selecting a first geodesic contour about an invariant reference point on said face, setting a region within said first geodesic contour as a first mask, selecting a second geodesic contour about a boundary of said identified first region, setting a region within said second geodesic contour as a second mask, and forming a final mask from a union of said first mask and said second mask.

SUMMARY OF THE INVENTION

There is provided, in accordance with some embodiments of the present invention, apparatus that includes a display and a processor. The processor is configured to receive, from a user, an input that indicates one or more points of interest on an electroanatomical map, of an anatomical surface, that is displayed on the display, and to superimpose on the map, in response to the input, a plurality of contours, each one of the contours being at a different respective geodesic distance, with respect to the surface, from the points of interest.

In some embodiments, the processor is configured to superimpose the contours at successive multiples of a particular geodesic distance from the points of interest.

In some embodiments,
the input is a first input,
the processor is further configured to receive, from the user, a second input that indicates the particular geodesic distance, and
the processor is configured to superimpose the contours in accordance with the second input.

In some embodiments, the processor is configured to superimpose the contours such that, for each contour of the contours, each point on the contour is at the same geodesic distance from whichever one of the points of interest is geodesically closest to the point.

In some embodiments, the processor is further configured to display on the display, for each contour of the contours, the geodesic distance of the contour from the points of interest.

In some embodiments, the plurality of contours is a first plurality of contours, and the processor is further configured to superimpose on the map, separately from the first plurality of contours, a second plurality of contours, at successive multiples of a particular Euclidean distance from a given plane.

In some embodiments, the processor is configured to superimpose the second plurality of contours on the map by projecting a plurality of lines onto the map, successive ones of the lines being spaced apart from each other by the particular Euclidean distance.

There is further provided, in accordance with some embodiments of the present invention, a method that includes receiving, by a processor, an input from a user that indicates one or more points of interest on a displayed electroanatomical map of an anatomical surface. The method further includes, in response to the input, superimposing, on the map, a plurality of contours, each one of the contours being at a different respective geodesic distance, with respect to the surface, from the points of interest.

There is further provided, in accordance with some embodiments of the present invention, a computer software product including a tangible non-transitory computer-readable medium in which program instructions are stored. The instructions, when read by a processor, cause the processor to receive, from a user, an input that indicates one or more points of interest on a displayed electroanatomical map of an anatomical surface, and to superimpose on the map, in response to the input, a plurality of contours, each one of the contours being at a different respective geodesic distance, with respect to the surface, from the points of interest.

The present invention will be more fully understood from the following detailed description of embodiments thereof, taken together with the drawings, in which:

BRIEF DESCRIPTION OF THE DRAWINGS

FIG. 4 is a schematic illustration of contours superimposed on a rotated electroanatomical map, in accordance with some embodiments of the present invention.

DETAILED DESCRIPTION OF EMBODIMENTS

Introduction

Figure 1:
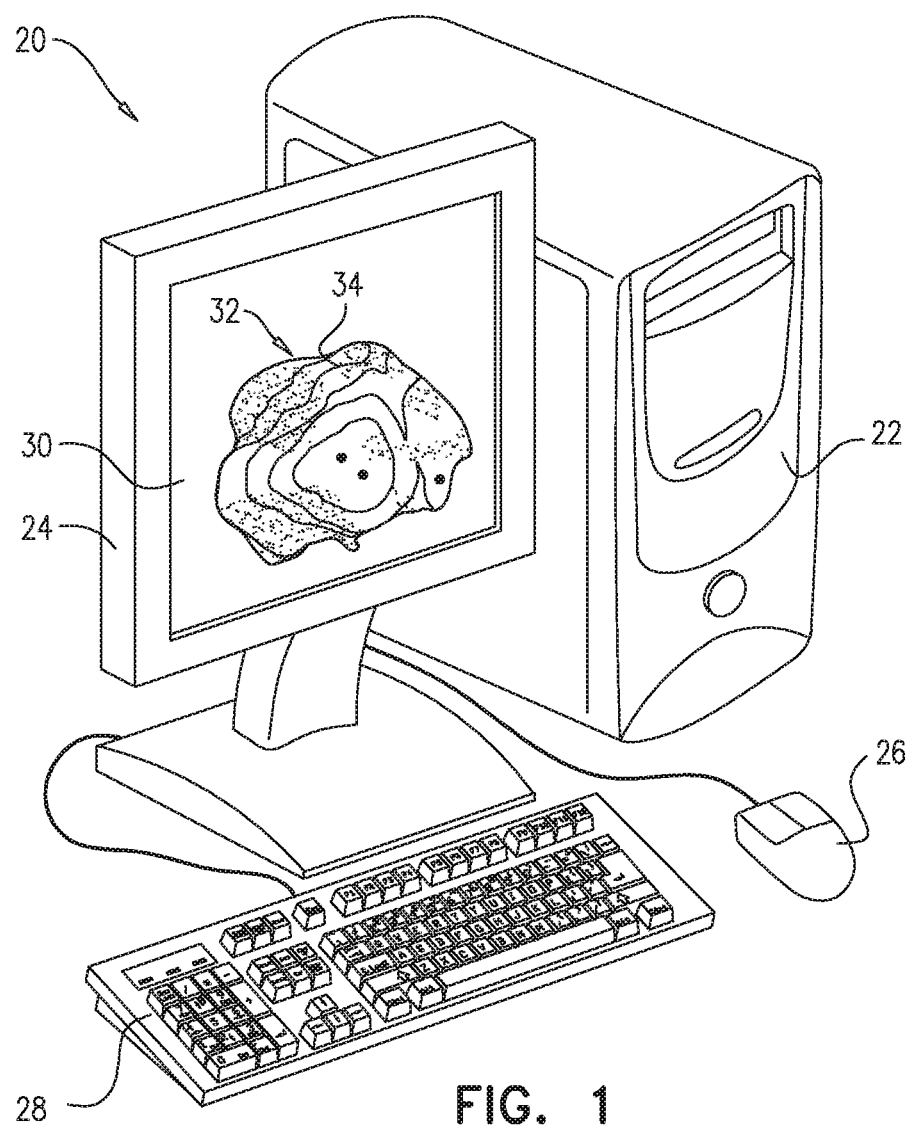
FIG. 1 is a schematic illustration of apparatus for visualizing distances between points on an electroanatomical map, in accordance with some embodiments of the present invention.

The geodesic distance between the two locations on the surface of a heart is, as described above in the Background, the length of the shortest path, along the surface of the heart, that connects the two locations. For simplicity, the present description and claims may refer to such a geodesic distance with reference to a rendered model of the surface, such as by referring to a geodesic distance between two points on the rendered model. Thus, for example, a statement such as "the contour is superimposed over the map at a particular geodesic distance from the point of interest on the map" means that the contour is superimposed over the points on the map that represent respective anatomical locations that are at the particular geodesic distance from the anatomical location that is represented by the point of interest. Likewise, an expression such as "the geodesic distance between the first and second contours" refers to the geodesic distance between (i) a first plurality of anatomical locations represented by the points over which the first contour is superimposed, and (ii) a second plurality of anatomical locations represented by the points over which the second contour is superimposed.

Similarly, for simplicity, the present description and claims may refer to other properties of an anatomical surface with reference to a rendered model of the surface. For example, the present description and claims may refer to an electrical propagation time between two points on the model.

Overview

In some embodiments, an electroanatomical map of a subject's heart is constructed. As implied by the word "electroanatomical," such a map combines anatomical information relating to the structure of the heart with information relating to the electrical activity of the heart. For example, the map may include a three-dimensional mesh, representing a surface of the heart, that is colored (or otherwise annotated) in accordance with local activation times (LATs), electrical potentials, and/or other properties that were measured at various locations on the surface. Such a mesh is typically constructed from a large number of data points, each of which corresponds to a particular location on the surface of heart at which the property of interest was measured.

In some cases, a user may wish to visualize the distance between points on, or areas of, the map. For example, the user may wish to visualize the geodesic distance between a point of interest on the map, and various other points on the map. Such a geodesic distance is often of interest, given that the geodesic distance between two locations on the surface of the heart is usually correlated with the time required for a bioelectric signal to propagate, along the surface of the heart, between the two locations.

Embodiments described herein facilitate such visualization, by superimposing a plurality of contours over the map, each of the contours being at a different respective geodesic distance from a point of interest that is indicated by the user. For example, each pair of successive contours may be spaced apart from one another by the same geodesic distance, such that, for example, the user sees a first contour geodesically spaced 5 mm from the point of interest, a second contour geodesically spaced 5 mm from the first contour (10 mm from the point of interest), a third contour geodesically spaced 5 mm from the second contour (15 mm from the point of interest), etc.

Aside from helping the user visualize geodesic distances from the point of interest, these contours may also help the user identify regions of impaired electrical propagation. For example, if the measured propagation time from the point of interest to a particular point on the map is greater than that which is implied by the geodesic distance between the points that is indicated by the superimposed contours, the user may infer that the tissue between the corresponding anatomical locations is not properly conducting bioelectric signals.

In some cases, the user may wish to visualize the geodesic distance between a particular point on the map and the closest one of a plurality of points of interest. For example, following an ablation procedure during which several regions on the cardiac surface are ablated, the user may wish to visualize the geodesic distance to the closest one of these regions. Embodiments described herein facilitate such visualization, by allowing the user to define multiple points of interest on the map, and then superimpose the contours such that, for each of the contours, each point on the contour is at the same geodesic distance from whichever one of the points of interest is geodesically closest to the point.

Alternatively to superimposing the above-described geodesically-spaced contours, a plurality of lines may be projected onto the map, such as to form a plurality of superimposed contours located at respective Euclidean distances from a given plane. Such a plurality of superimposed contours provide the user with an alternate way to visualize distances between points on the map.

Although the present description relates mainly to electroanatomical maps, it is noted that embodiments described herein may be used to visualize distances between points on any suitable three-dimensional model that is rendered on-screen.

Apparatus Description

Reference is initially made to FIG. 1, which is a schematic illustration of apparatus 20 for visualizing distances between points on an electroanatomical map 32, in accordance with some embodiments of the present invention. Apparatus 20 comprises a processor 22 and a display 24, comprising a screen 30, and may further comprise one or more input devices, such as a mouse 26 and/or a keyboard 28. In some embodiments, screen 30 is a touch screen, such that display 24 also functions as an input device.

As shown in FIG. 1, processor 22 renders, on screen 30, a three-dimensional electroanatomical map 32, such as an electroanatomical map of a surface of a subject's heart. As described in detail below, the processor further superimposes a plurality of contours 34 over electroanatomical map 32, e.g., based on inputs received from a user via mouse 26 and/or keyboard 28. The user may then use any suitable input device to zoom-in to map 32, rotate the map, and/or interact with the map in any other suitable way, while viewing the contours superimposed on the map.

It is emphasized that the contours are superimposed onto the actual surface of the map, such that the contours effectively become part of the rendered model. Hence, even as the user's view of the map is adjusted, the contours do not move, relative to the surface of the map. For example, as the map is rotated, the contours rotate along with the map.

In general, processor 22 may be embodied as a single processor, or as a cooperatively networked or clustered set of processors. Processor 22 is typically a programmed digital computing device comprising a central processing unit (CPU), random access memory (RAM), non-volatile secondary storage, such as a hard drive or CD ROM drive, network interfaces, and/or peripheral devices. Program code, including software programs, and/or data are loaded into the RAM for execution and processing by the CPU and results are generated for display, output, transmittal, or storage, as is known in the art. The program code and/or data may be downloaded to the computer in electronic form, over a network, for example, or it may, alternatively or additionally, be provided and/or stored on non-transitory tangible media, such as magnetic, optical, or electronic memory. Such program code and/or data, when provided to the processor, produce a machine or special-purpose computer, configured to perform the tasks described herein.

Figure 2A:
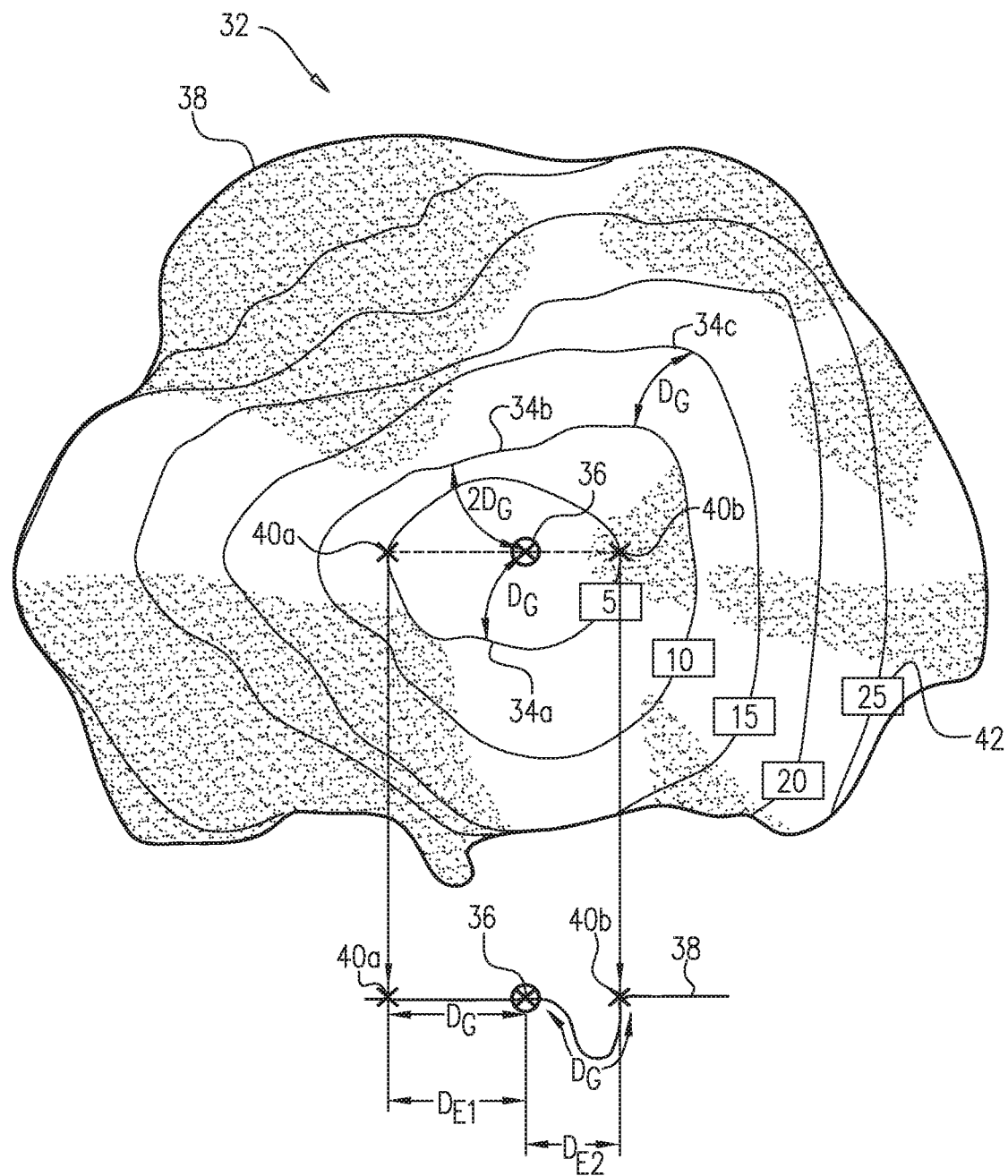
FIGS. 2A-B are schematic illustrations of geodesically-spaced contours superimposed over an electroanatomical map, in accordance with some embodiments of the present invention.
Figure 2B:
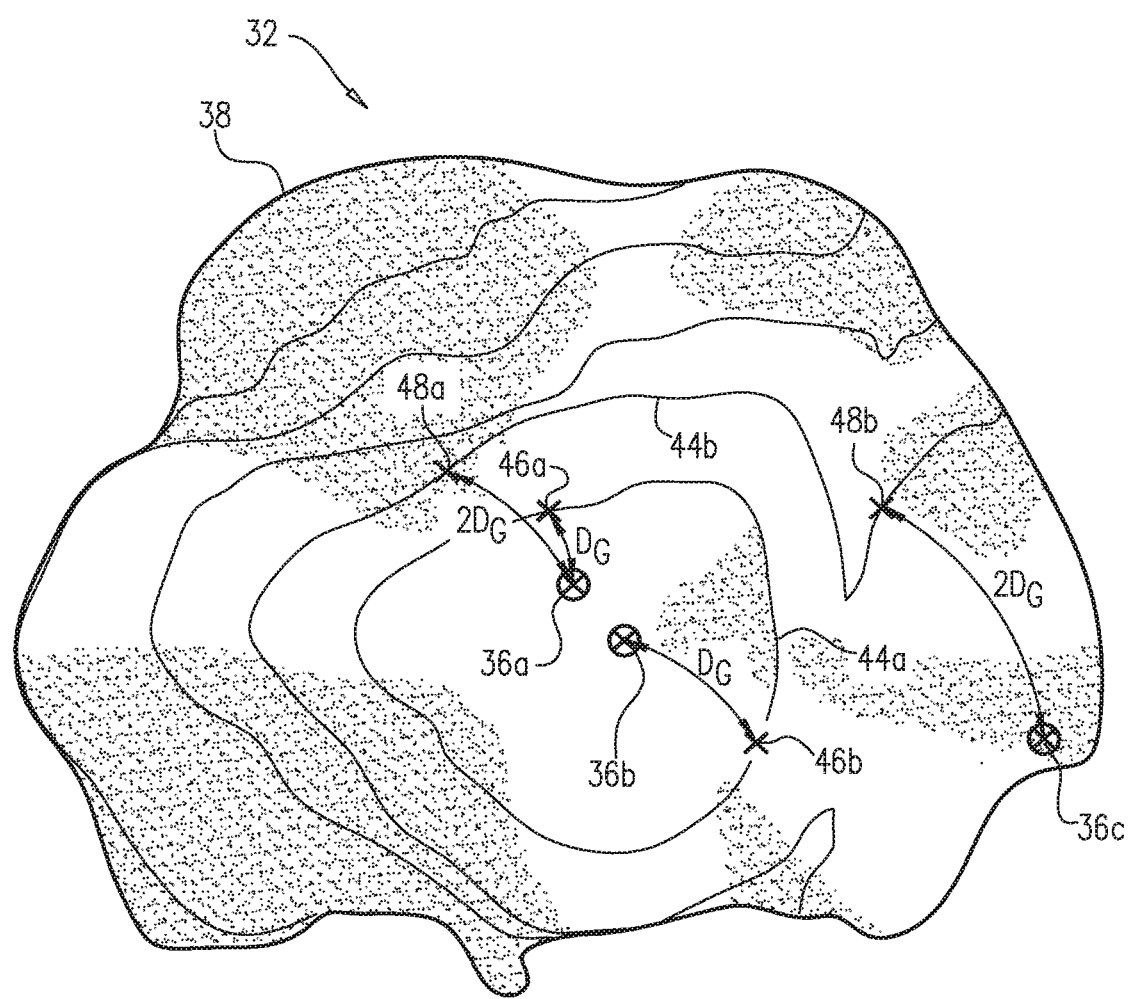

Reference is now made to FIGS. 2A-B, which are schematic illustrations of geodesically-spaced contours superimposed over an electroanatomical map 32, in accordance with some embodiments of the present invention.

To superimpose the contours as shown in FIGS. 2A-B, the processor first receives an input from the user that indicates one or more points of interest on the surface 38 of the displayed electroanatomical map. For example, to indicate a particular point of interest, the user may position the cursor of mouse 26 (FIG. 1) over the point of interest, and then click the mouse. The processor may then receive the click, and, in response thereto, superimpose the contours as described below.

FIG. 2A illustrates a scenario in which the user has indicated a single point of interest 36. In response to this indication, the processor superimposes, on surface 38, a plurality of contours having different respective geodesic distances, with respect to the anatomical surface that is represented by surface 38, from point of interest 36. (Typically, the processor also displays a marker over the indicated point of interest, as illustrated in the figure.) For example, the processor may superimpose the contours at successive multiples of a particular geodesic distance $D_G$ from the point of interest. FIG. 2A illustrates such an embodiment, whereby a first contour 34a is spaced from the point of interest by a geodesic distance $D_G$, a second contour 34b is spaced from first contour 34a by the same geodesic distance $D_G$, and, likewise, a third contour 34c is spaced from second contour 34b by the same geodesic distance $D_G$. Thus, first contour 34a is at a distance $D_G$ from the point of interest, second contour 34b is at a distance $2D_G$ (as indicated in the figure), and third contour 34c is at a distance $3D_G$.

(To obviate any confusion, it is noted that a contour is said to be at a given geodesic distance from a point, if every point on the contour is at the given geodesic distance from the point. Likewise, a second contour is said to be at a given geodesic distance from a first contour, if every point on the second contour is at the given geodesic distance from the closest point on the first contour.)

In some embodiments, the processor receives, from the user, a second input that indicates the particular geodesic distance, or "geodesic spacing," $D_G$. For example, the user may enter this quantity (e.g., expressed in units of mm) using mouse 26 or keyboard 28. The processor then superimposes the contours in accordance with the desired geodesic spacing. For example, with reference to FIG. 2A, the user may enter the desired geodesic spacing $D_G$, and the processor may then space successive contours from one another (and space the first contour from the point of interest) by this desired spacing, as described above. Typically, following an initial superimposition of contours, the user is provided the ability to change the spacing of the contours, by entering a new desired geodesic spacing. The processor may then redraw the contours (moving, adding, or removing contours, as necessary), in accordance with the new desired geodesic spacing.

In some embodiments, the processor displays, for each of the contours, the geodesic distance of the contour from the point of interest. For example, as shown in FIG. 2A, the processor may superimpose, on each of the contours, an indicator that indicates the geodesic distance of the contour. Typically, the distances are expressed in units of mm. (FIG. 2A shows an example in which $D_G=5$ mm.)

It is again noted that, as described above in the Background, the geodesic distance between two points may differ from the Euclidean distance between them. For example, FIG. 2A shows a cross-section of surface 38 along a line passing through (i) a first point 40a that lies on first contour 34a, (ii) point of interest 36, and (iii) a second point 40b that also lies on first contour 34a. As shown, although the geodesic distance between first point 40a and point of interest 36 is the same as the geodesic distance between second point 40b and point of interest 36, the Euclidean distance $D_{E1}$ between first point 40a and point of interest 36 is greater than the Euclidean distance $D_{E2}$ between second point 40b and point of interest 36, due to the curvature of surface 38.

FIG. 2B differs from FIG. 2A, in that FIG. 2B depicts a scenario in which the user has selected three points of interest: a first point of interest 36a, a second point of interest 36b, and a third point of interest 36c. In such a scenario, each point on each of the contours is at the same geodesic distance from one of the points of interest, although this point of interest is not necessarily the same for each of the points on the contour. For example, each point on any given one of the contours may be at the same geodesic distance from whichever one of the points of interest is geodesically closest to the point. Such an embodiment is illustrated in FIG. 2B, whereby a first contour 44a is at a geodesic distance $D_G$ from the points of interest, in the sense that each point on contour 44a is at geodesic distance $D_G$ from the point of interest that is closest to the point. Thus, for example, a first point 46a on first contour 44a is at a geodesic distance $D_G$ from first point of interest 36a, while a second point 46b on first contour 44a is at the same geodesic distance $D_G$ from second point of interest 36b. Similarly, a second contour 44b is at a geodesic distance $2D_G$ from the points of interest, in the sense that each point on contour 44b is at geodesic distance $2D_G$ from the point of interest that is closest to the point. Thus, for example, a first point 48a on second contour 44b is at a geodesic distance $2D_G$ from first point of interest 36a, while a second point 48b on second contour 44b is at the same geodesic distance $2D_G$ from third point of interest 36c.

In other embodiments, each point on any given one of the contours is at the same geodesic distance from whichever one of the points of interest is geodesically farthest from the point. In yet other embodiments, multiple sets of contours may be superimposed on surface 38, each of the sets being geodesically spaced with respect to a different respective one of the points of interest.

In general, any of the various embodiments described above with reference to FIG. 2A may also be practiced with multiple points of interest. For example, the contours may be superimposed at successive multiples of a particular geodesic distance, which may be received as input from the user, from the points of interest, and/or indicators 42 may be displayed over the contours, to indicate the respective geodesic distances of the contours.

Figure 3:
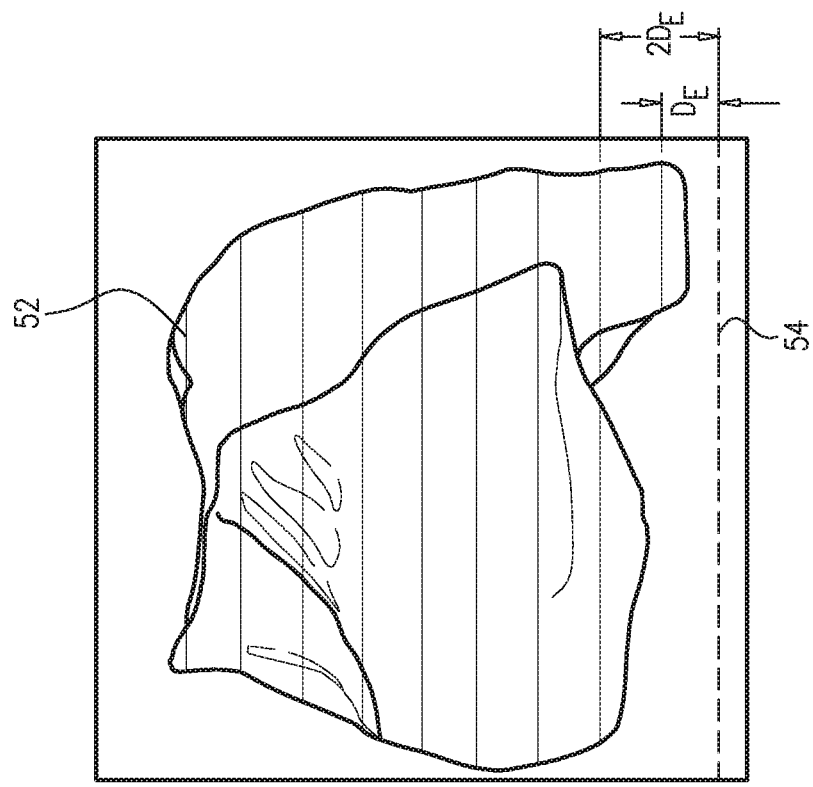
FIG. 3 is a schematic illustration of a superposition of contours onto an electroanatomical map, in accordance with some embodiments of the present invention.
Figure 3:
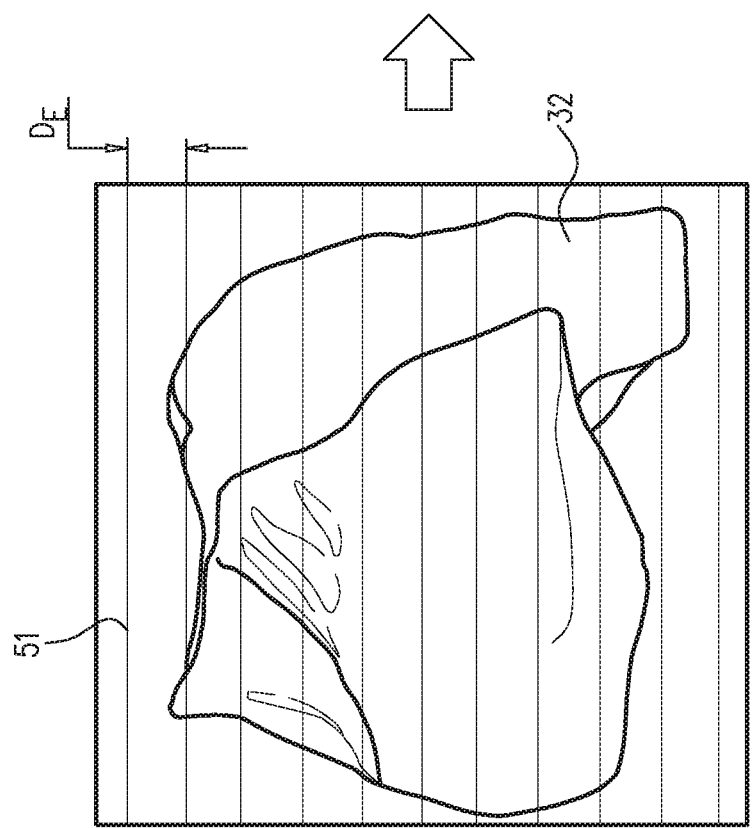

Reference is now made to FIG. 3, which is a schematic illustration of a superposition of contours 52 onto electroanatomical map 32, in accordance with some embodiments of the present invention. Reference is additionally made to FIG. 4, which is a schematic illustration of contours 52 superimposed on a rotated electroanatomical map, in accordance with some embodiments of the present invention.

Contours 52 differ from contours 34, described with reference to the earlier figures, in that contours 52 are not geodesically spaced from points of interest. Rather, to superimpose contours 52, the processor typically projects a plurality of lines 51, successive ones of the lines being spaced apart from each other by a Euclidean distance $D_E$, onto the map. (Typically, lines 51 are either vertical or horizontal with respect to the screen.) Such a projection yields a plurality of contours 52, located at successive multiples of a distance $D_E$ from a given plane 54. (To explicate further, it may be stated that lines 51 represent respective planes that are perpendicular to the screen, each of these planes being at a respective multiple of distance $D_E$ from plane 54, and contours 52 mark the points on the map at which these planes intersect the surface of the map.) In some embodiments, the user indicates the desired Euclidean spacing $D_E$, and the processor then superimposes the contours in accordance with this desired spacing.

It is noted that lines 51 and plane 54 are typically not displayed on the screen. Moreover, plane 54 is typically not explicitly computed by the processor at all. Rather, plane 54 is defined only implicitly, by virtue of the spacing $D_E$ between lines 51.

The superposition of contours 52 is typically performed separately from the superposition of contours 34 that was described above, such that contours 34 and contours 52 are not displayed at the same time. Typically, the user instructs the processor which type of contours to display, in accordance with the user's desired method of visualizing distances between points on the map. The processor then superimposes the appropriate type of contours, in accordance with the user's instructions.

Following the superposition of contours 52, the respective positions of contours 52 may remain fixed with respect to the surface of the map, as described above for contours 34. Thus, for example, as shown in FIG. 4, as the user rotates the map, the processor may rotate the contours along with the map. Alternatively, e.g., in accordance with the user's instructions, the processor may continually re-project lines 51 onto the map, such that contours 52 are continually superimposed over the map in the desired orientation (e.g., a vertical or horizontal orientation), even as the map is rotated.

It will be appreciated by persons skilled in the art that the present invention is not limited to what has been particularly shown and described hereinabove. Rather, the scope of embodiments of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. Apparatus, comprising:
   a display; and
   a processor, configured:
      to receive, from a user, a first input that indicates one or more points of interest on an electroanatomical map, of an anatomical surface, that is displayed on the display;
      to receive, from the user, a second input that indicates a particular geodesic distance from the point of interest; and
      to superimpose on the map, in response to the second input, a plurality of contours, each one of the contours being at successive multiples of the particular geodesic distance, with respect to the surface, from the points of interest.

2. The apparatus according to claim 1, wherein the processor is configured to superimpose the contours such that, each contour of the contours is at the same geodesic distance from the same geodesically closest point of interest.

3. The apparatus according to claim 1, wherein the processor is further configured to display on the display, for each contour of the contours, the geodesic distance of the contour from the points of interest.

4. The apparatus according to claim 1, wherein the plurality of contours is a first plurality of contours, and wherein the processor is further configured to superimpose on the map, separately from the first plurality of contours, a second plurality of contours, at successive multiples of a particular Euclidean distance from a given plane.

5. The apparatus according to claim 4, wherein the processor is configured to superimpose the second plurality of contours on the map by projecting a plurality of lines onto the map, successive ones of the lines being spaced apart from each other by the particular Euclidean distance.

6. A method, comprising:
   receiving, by a processor, an input from a user that indicates one or more points of interest on a displayed electroanatomical map of an anatomical surface; and
   in response to the input, superimposing, on the map, a plurality of contours at successive multiples of a particular geodesic distance with respect to the surface, from the points of interest.

7. The method according to claim 6,
wherein the input is a first input,
wherein the method further comprises receiving, from the user, a second input that indicates the particular geodesic distance, wherein superimposing the contours comprises superimposing the contours in accordance with the second input.

8. The method according to claim 6, wherein superimposing the contours comprises superimposing the contours such that, for each contour of the contours, each point on the contour is at the same geodesic distance from whichever one of the points of interest is geodesically closest to the point.

9. The method according to claim 6, further comprising displaying, for each contour of the contours, the geodesic distance of the contour from the points of interest.

10. The method according to claim 6, wherein the plurality of contours is a first plurality of contours, and wherein the method further comprises superimposing on the map, separately from the first plurality of contours, a second plurality of contours, at successive multiples of a particular Euclidean distance from a given plane.

11. The method according to claim 10, wherein superimposing the second plurality of contours on the map comprises superimposing the second plurality of contours on the map by projecting a plurality of lines onto the map, successive ones of the lines being spaced apart from each other by the particular Euclidean distance.

12. A computer software product comprising a tangible non-transitory computer-readable medium in which program instructions are stored, which instructions, when read by a processor, cause the processor:
to receive, from a user, a first input that indicates one or more points of interest on a displayed electroanatomical map of an anatomical surface;
to receive, from the user, a second input that indicates the particular geodesic distance from the one or more points of interest: and
to superimpose on the map, in response to the second input, a plurality of contours at successive multiples of a particular geodesic distance, with respect to the surface, from the points of interest.

13. The computer software product according to claim 12, wherein the instructions cause the processor to superimpose the contours such that, for each contour of the contours, each point on the contour is at the same geodesic distance from whichever one of the points of interest is geodesically closest to the point.

14. The computer software product according to claim 12, wherein the instructions further cause the processor to display, for each contour of the contours, the geodesic distance of the contour from the points of interest.

15. The computer software product according to claim 12, wherein the plurality of contours is a first plurality of contours, and wherein the instructions further cause the processor to superimpose on the map, separately from the first plurality of contours, a second plurality of contours, at successive multiples of a particular Euclidean distance from a given plane.

* * * * *